US006576843B1

(12) United States Patent
Ashworth (10) Patent No.: US 6,576,843 B1
(45) Date of Patent: Jun. 10, 2003

(54) POWER SUPERCONDUCTING POWER TRANSMISSION CABLE

(75) Inventor: Stephen P. Ashworth, Cambridge (GB)

(73) Assignee: Brookhaven Science Associates, LLC, Upton, NY (US)

( * ) Notice: Subject to any disclaimer, the term of this patent is extended or adjusted under 35 U.S.C. 154(b) by 38 days.

(21) Appl. No.: 09/617,773

(22) Filed: Jul. 17, 2000

(51) Int. Cl.[7] ............................................... H01B 12/60
(52) U.S. Cl. .................... 174/125.1; 505/231; 505/431; 29/599
(58) Field of Search ............................. 174/125.1, 15.5, 174/15.6; 505/230, 231, 430, 431, 432, 433, 434; 29/599

(56) References Cited

U.S. PATENT DOCUMENTS

| | | | |
|---|---|---|---|
| 3,715,451 A | 2/1973 | Hammer et al. | 174/15 C |
| 3,730,966 A | 5/1973 | Aupoix et al. | 174/15 C |
| 3,736,365 A | 5/1973 | Bobo et al. | 174/15 C |
| 3,749,811 A | 7/1973 | Bogner et al. | 174/15 |
| 4,329,539 A | 5/1982 | Tanaka et al. | 174/128 |
| 4,409,425 A | 10/1983 | Ries | 174/15 S |
| 4,843,356 A | 6/1989 | Lusignan et al. | 333/236 |
| 5,017,552 A | 5/1991 | Porcell | 505/1 |
| 5,200,577 A | 4/1993 | Shimada | 174/125 |
| 5,330,969 A | 7/1994 | Finnemore et al. | 505/431 |
| 5,736,839 A | 4/1998 | Pettersson | 323/213 |
| 5,929,385 A * | 7/1999 | Sugimoto et al. | 174/125.1 |
| 5,932,523 A * | 8/1999 | Fujikami et al. | 505/231 |
| 6,255,595 B1 * | 6/2001 | Metra et al. | 174/125.1 |
| 6,262,375 B1 * | 7/2001 | Engelhardt et al. | 174/125.1 |

OTHER PUBLICATIONS

S.P. Ashworth, *A Techno–Economic Design Study of High–Temperature Superconducting Power Transmission Cables*, European Transaction on Electrical Power, vol. 4, No. 4, Jul. 1994.

E.B. Forsyth, *Superconducting Power Transmission Systems—the Past and Possibly the Future*, Superconducting Sci. Technol. 6, 699–714, 1993.

* cited by examiner

*Primary Examiner*—Kamand Cuneo
*Assistant Examiner*—Jeremy Norris
(74) *Attorney, Agent, or Firm*—Margaret C. Bogosian (57) ABSTRACT

The present invention is for a compact superconducting power transmission cable operating at distribution level voltages. The superconducting cable is a conductor with a number of tapes assembled into a subconductor. These conductors are then mounted co-planarly in an elongated dielectric to produce a 3-phase cable. The arrangement increases the magnetic field parallel to the tapes thereby reducing ac losses.

19 Claims, 6 Drawing Sheets

Optimization array for 4″ total diameter cable with total ac losses of 1W/m based on data of 120A critical current superconducting tape. A transmission capacity of zero indicates that no solution could be found within the design diameter.

FIGURE 5 ac Losses of 'center' and 'edge' tapes of a planar array of three tapes as a function of total transport current. One array composed of tapes with an individual critical current of 60A, one array with individual critical currents of 120A

FIGURE 6

POWER SUPERCONDUCTING POWER TRANSMISSION CABLE

This invention was made with Government support under contract number DE-AC02-98CH10886, awarded by the U.S. Department of Energy. The Government has certain rights in the invention.

BACKGROUND OF THE INVENTION

1. Field of the Invention

The present invention relates to a superconducting cable, and more particularly to a compact superconducting power transmission cable operating at distribution level voltages.

2. Description of the Prior Art

A superconducting power transmission cable must be capable of transmitting a heavy current with low energy loss in a compact conductor. Power transmission is generally made through an alternating current, and a superconductor employed under an alternating current is inevitably accompanied by an energy loss, which is generically called an ac loss.

A previous patent describing a superconducting power cable is found in U.S. Pat. No. 5,932,523 to Fujikami et al. Fujikami describes a superconducting cable conductor employing an oxide superconductor, which comprises a long flexible core member, a plurality of tape-shaped multifilamentary oxide superconducting wires, which are spirally wound on the core member, and an electric insulating layer. The plurality of tape-shaped superconducting wires wound on the core member form a plurality of layers, each of which is formed by winding a plurality of tape-shaped superconducting wires in a side-by-side manner. The plurality of layers are successively stacked on the core member.

U.S. Pat. No. 5,200,577 to Shimada describes a large electric capacity superconducting cable that is formed by twisting a bundle of a plurality of superconducting material wires with each other about a core member arranged at a central portion of the bundle.

U.S. Pat. No. 4,409,425 to Ries describes how the stabilization of the superconducting elements is achieved by arranging further special stabilizing elements of normal conducting material parallel to the superconducting elements. The stabilizing elements and the superconducting elements are twisted together to form a flat cable and can be arranged around a carried body in a ribbon shape.

There are a number of patents describing superconducting wires composed primarily of a bismuth-strontium-calcium-copper-oxide (BSCCO). The methods of forming the wires are described in U.S. Pat. No. 5,330,969 to Finnemore et al and U.S. Pat. No. 6,069,116 to Li et al. By using this material a superconducting power transmission cable can be made such that it operates at distribution level voltages. There is interest in the electric power utility industry for a design of a 3-phase cable, in 100 MVA, with a diameter of less than 100 mm, operating at distribution level voltages, e.g. 30 kV.

SUMMARY OF THE INVENTION

An object of the present invention is to provide a manufacturable compact superconducting power transmission cable capable of operating at distribution level voltages. This design positions the superconducting material to minimize the magnetic field component perpendicular to the conductor face, thus reducing the ac losses of the superconductor. This allows the conductors within a phase of the cable, and the separate phases of a three-phase cable, to be placed closer together than in existing designs. This results in a very compact cable for a given power rating.

The three phase cable is made of up of three phase conductors surrounded by a dielectric. The whole cable is surrounded by thermal insulation. Each phase conductor of a three phase cable is made of up of a number of parallel subconductors and has a void space for liquid coolant.

Each subconductor is a planar array of a number of High Temperature Superconductors (HTS). The spacing between the HTS conductors within each array is chosen to reduce the perpendicular component of magnetic field on the two edge conductors due to the current in the HTS conductors. The number of subconductors per phase and the number of HTS conductors per subconductors are chosen to minimize the overall diameter of the cable within the constraints of the allowed ac losses of the cable.

A preferred form of the superconducting power transmission cable, as well as other embodiments, features and advantages of this invention will be apparent from the following detailed description of illustrative embodiments thereof, which is to be read with in connection with the accompanying drawings.

DETAILED DESCRIPTION

Figure 4:
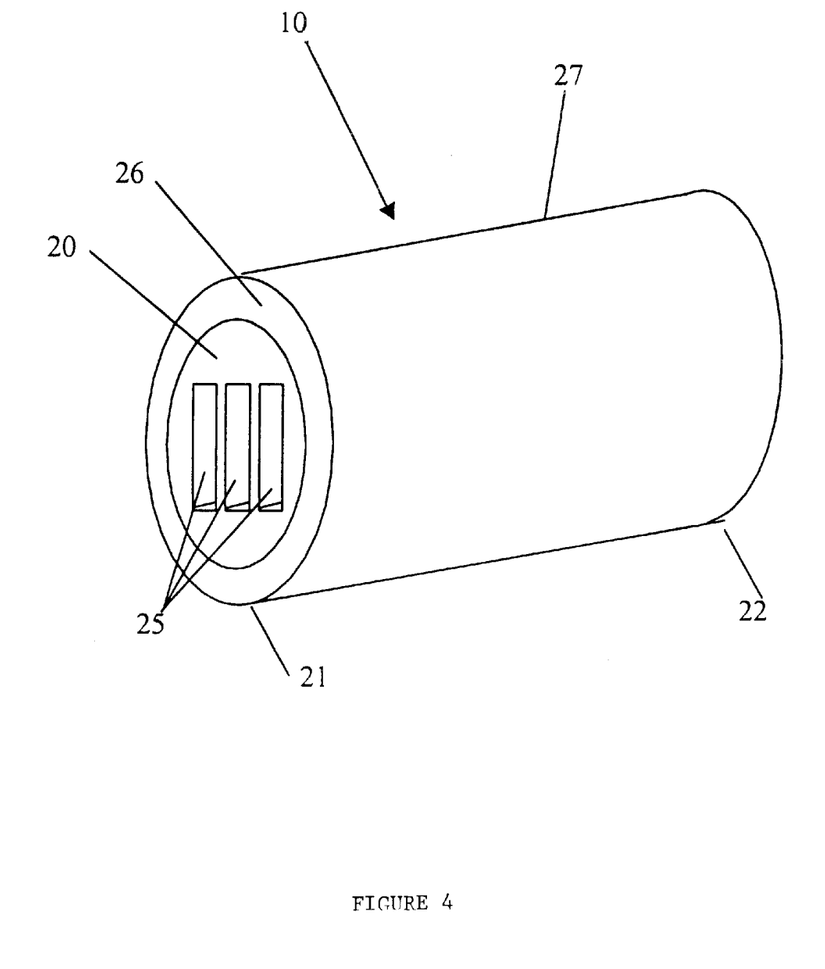
FIG. 4 is a perspective view of the superconducting power transmission cable showing the dielectric member, apertures, first and second ends, thermal insulation and outer sheath.

According to the present invention, the superconducting power transmission cable 10 has an elongated dielectric member 20 with a first and a second end 21, 22 and at least one aperture 25 extending through the elongated dielectric member 20 from the first to the second end 21, 22 as shown in FIG. 4. The elongated dielectric member 20 may be any suitable insulating material, such as an extruded dielectric for ease of manufacture, wrapped paper or any equivalent means. The elongated dielectric member 20 may have but is not limited to a cylindrical or rectangular shape. The aperture 25 can be any shape and is sized to fit the conductor 30. It will be obvious to one skilled in the art the useful shape and size of the elongated dielectric member 20 and the at least one aperture 25. In the preferred embodiment, the elongated dielectric member 20 has three apertures 25.

Figure 1:
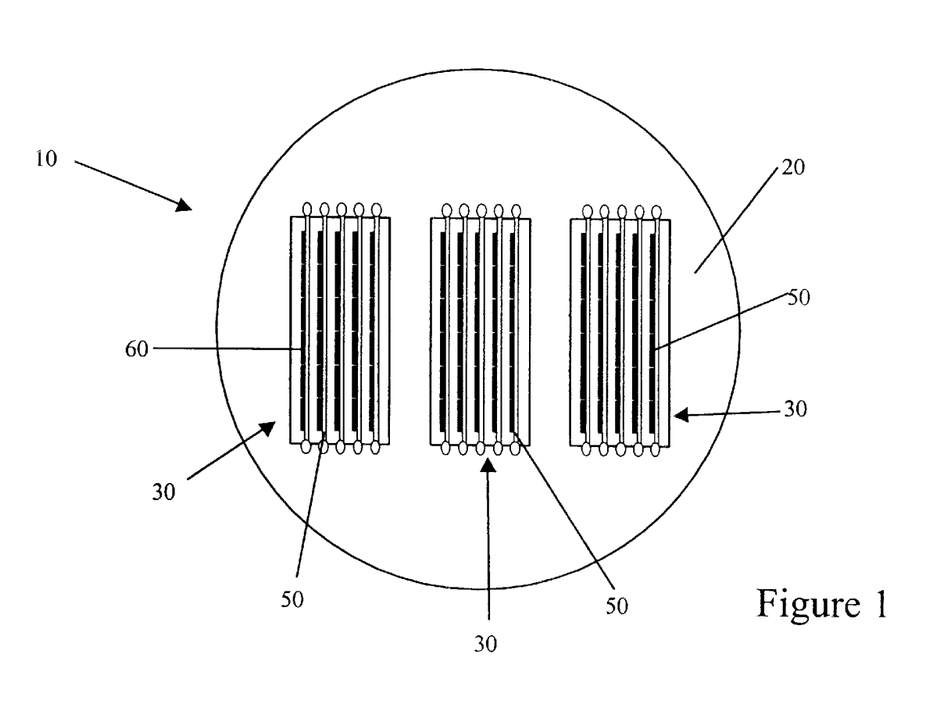
FIG. 1 across sectional view of the full superconducting power transmission cable showing the dielectric member, the three phase conductors, subconductors, and tapes.

Inside of the aperture 25 is a conductor 30 composed of at least one superconducting material. The conductor 30 may be a phase conductor. This superconducting material could be composed of but is not limited to a bismuth-strontium-calcium-copper-oxide or any other superconducting material well known to one skilled in the art. In the preferred embodiment there are three conductors 30, one inside of each aperture 25 to form a three-phase cable. The three apertures 25 are arranged to minimize the interaction between a magnetic field generated by one of said three conductors 30 and a current carried by said three conductors 30. In the preferred embodiment, the three apertures 25 are coplanar, lying within the same plane, within the elongated dielectric member 20 as shown in FIGS. 1 and 4.

Additionally in the present invention the superconducting power transmission cable 10 has means for cooling (not shown) said conductor 30 and means for thermally insulating 26 said elongated dielectric member 20 from outside conditions. The means for cooling may be any refrigerant means including but not limited to a void space for nitrogen, liquid helium, or neon flow. The means for thermally insulating 26 may be but is not limited to a vacuum space containing Superinsulation or any other equivalent means. There may also be an outer sheath 27. In the preferred embodiment the means for thermally insulating 26 is a cryogenic insulation jacket. The super-insulation plus the vacuum gives the lowest superconducting power transmission cable 10 diameter. The means for cooling and thermal insulation 26 will be obvious to one skilled in the art.

Figure 3:
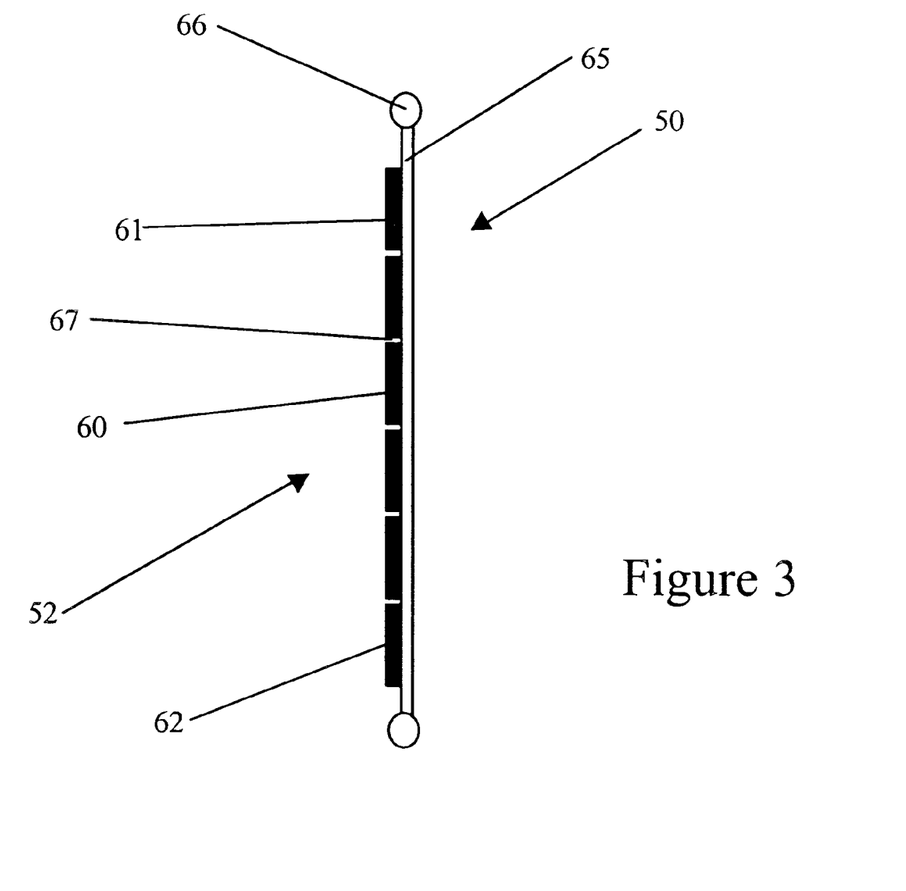
FIG. 3 is a view of conductor showing the support, the tapes, and the gaps.

The conductor 30 is composed of at least one subconductor 50 as shown in FIG. 3. In the preferred embodiment, each of the three conductors 30 is composed of at least one subconductor 50. The subconductor 50 is made up of any superconducting material. The subconductors 50 could be individually drawn into the elongated dielectric member 20, it may be extruded directly onto pre-assembled phase conductors 30. It will be obvious to one skilled in the art the different ways to manufacture and assemble the superconducting power transmission cable 10.

For a commercial, economical, viable design of a superconducting power transmission cable 10, the cable 10 design is optimized to minimize the cost of transmitting power. This optimization includes considering the number and location of the necessary cooling means, and refrigerant pumps.

The number of subconductors 50 is optimized to maximize said conductor's 30 electrical capacity for said elongated dielectric member's 20 diameter. In one industry commercial application, the superconducting power transmission cable's 10 diameter should be approximately 100 mm. The capacity desired for this superconducting power transmission cable 10 is in excess of 100 MVA. Other applications using this present invention may have different requirements for the cable's 10 diameter and the capacity.

Figure 5:
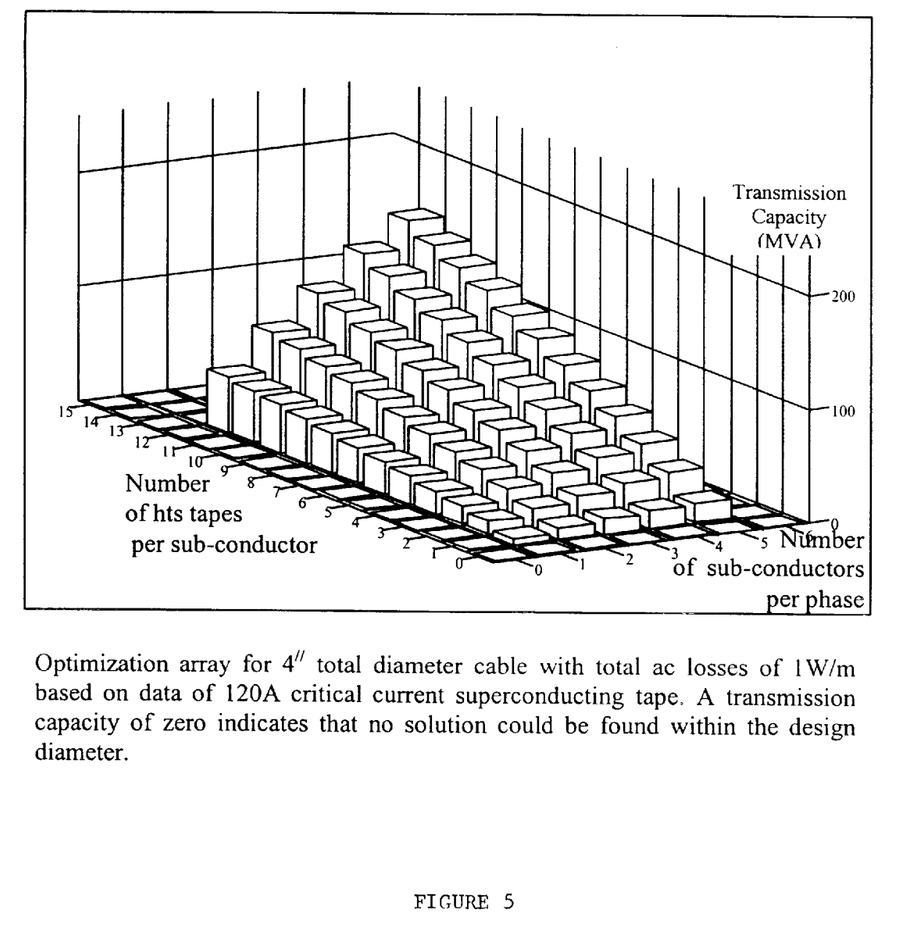
FIG. 5 illustrates relation between number of tapes per subconductor and number of subconductors per phase for a given diameter to optimize the cable transmission.

An example an optimization method to maximize the said conductor's 30 electrical capacity for said elongated dielectric member's 20 diameter is shown in FIG. 5. From the data on ac losses in HTS conductors for a range of currents, e.g. 10A–120A, calculations where performed to calculate the total ac losses for a range of currents, of subconductors 50 per phase and of conductors per subconductor 50. The configurations with high ac losses were rejected. Next, the size of the cable 10 was calculated for a range of subconductors 50 per conductor 30 and a range of HTS conductors 60 per subconductor 50. The configurations with a diameter that exceeded the maximum were rejected. The configuration was then selected with the highest transmitted power within the given diameter.

In another embodiment, the number of subconductors 50 is optimized to minimize the elongated dielectric member's 10 diameter for said conductor's 30 electrical capacity.

The subconductor 50 is positioned to minimize ac losses in said subconductor 50 due to magnetic fields from another said subconductor 50. In the three conductor embodiment, each subconductor 50 within each of the three conductors 30 is positioned to minimize ac losses due to magnetic fields from another said subconductor 50.

In the preferred embodiment, the ac losses in said subconductor 50 are minimized by minimizing the component of magnetic field perpendicular to said subconductor 50 thereby maximizing the component of magnetic field parallel. This minimization can be accomplished by positioning said subconductor 50 substantially in parallel to the local magnetic field. In the preferred embodiment, the arrangement of the subconductors 50 is designed to minimize the interaction between magnetic field generated by one phase conductor 30 and the current carried by another subconductor 50. The anisotropy of the superconducting material is a controlling factor in the design of the arrangement, thus the conductors 30 or subconductors 50 are arranged to minimize the perpendicular components of magnetic field. In another embodiment, ac losses are further minimized by optimizing the size of said subconductor 50.

In the preferred embodiment the subconductor 50 comprises at least one support 65 and the superconducting material is affixed in an array 52 on said support 65. The array 52 in the preferred embodiment is planar, as shown in FIG. 3. While it is possible to have another configuration of the array 52 wherein the ac losses may be further reduced, such as a curved array, a planar configuration can be manufactured commercially.

In the three conductor embodiment, each subconductor 50 has at least one support 65 and the superconducting material is affixed in an array 52 on each said support 65. In either embodiment, the array 52 is optimized to minimize the ac losses in said at least one subconductor 50 due to magnetic fields from another subconductor 50. The support 65 is made of a non-superconducting material and may be composed of but is not limited to steel, hastelloy, or any other equivalent means. The support's 65 size is determined by the number of tapes 60 in the array 52. The support's 65 shape is determined by the shape of the array 52, in the preferred embodiment the array 52 is planar. The support 65 is located at a specific place inside of the aperture 25 such that the subconductor spacing 70 is maintained throughout the elongated dielectric member 20.

There may be support edges 66 configured to reduce local electrical stress and to locate subconductor 50 in elongated dielectric member 20 as shown in FIG. 3. The support edges 66 may be but are not limited to being rounded. However, it will be apparent to one skilled in the art that the present invention may be practiced without these specific details.

In the preferred embodiment the superconducting material is an elongated bismuth-strontium-calcium-copper-oxide (BSCCO) tape as described in U.S. Pat. No. 5,330,969 to Finnemore, et al. The preferred superconducting material is BSCCO-2223. The subconductors 50 are made of BSCCO tapes 60 and are laminated to a non-magnetic support 65 in an array 52. While the tapes 60 are laminated in a planar array 52 on one side of said support 65, it will be obvious to one skilled in the art that other arrangements of the array 52 are possible. Examples would include but are not limited to affixing the tapes 60 on both the first and second side of said support 65.

In the preferred embodiment the number of tapes 60 is optimized for the design criteria. The design criteria for a manufacturable compact superconducting power transmission cable 10 capable of operating at distribution level voltages includes considering the total transmission capability, line voltage, and allowable cable 10 diameter.

The array 52 includes small tape-gaps 67 edge-to-edge between the tapes 60, as shown in FIG. 3 to reduce edge fields. The ac losses in BSCCO tapes 60 is strongly dependent on external magnetic fields directed perpendicularly to the tape face and significantly less strongly on fields in parallel directions. The number and size of said tape-gaps 67 are optimized to minimize ac losses in said subconductor 50 due to magnetic fields from another tape 60. When the tape-gaps 67 are in the optimal position, the ac losses in the end tapes 61, 62 is actually greater than the ac losses in the central tapes 60. Yet the central tapes 60 has decreased its ac losses such that the overall ac loss of the subconductor 50 are within design criteria.

Figure 2:
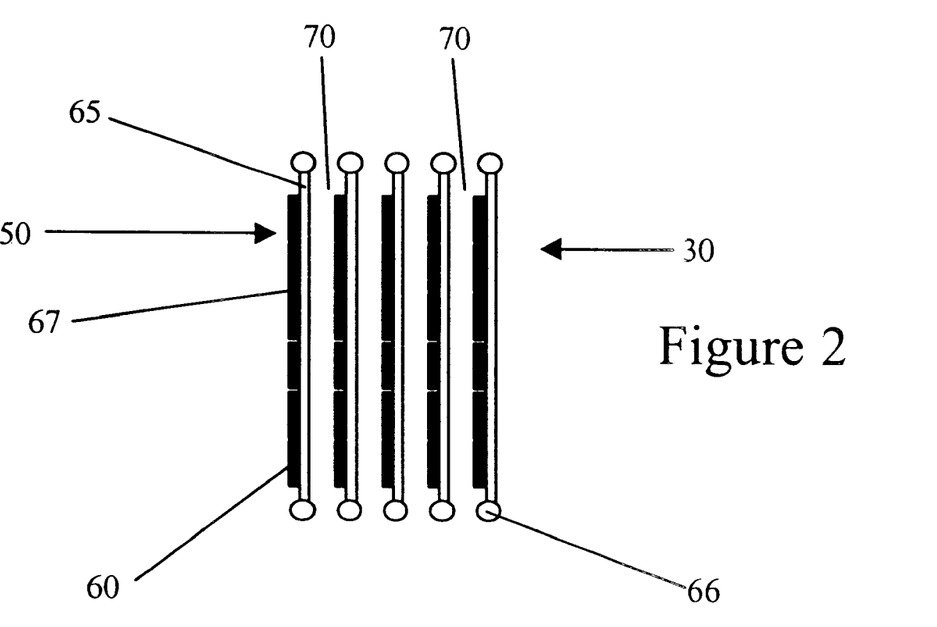
FIG. 2 is a view of the conductor, showing the subconductors including the supports, the tapes, and the gaps.
Figure 6:
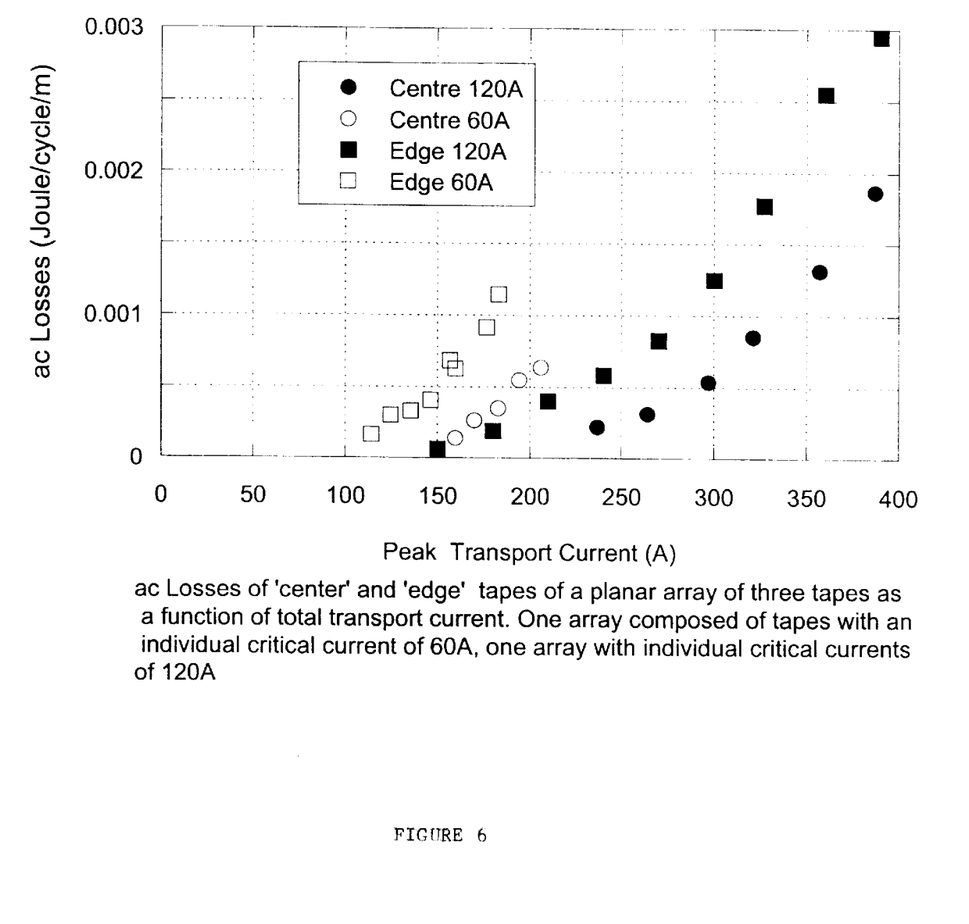
FIG. 6 illustrates the relation between the ac losses and the peak transport current for the central tapes and the end tapes.

The two end tapes 61, 62 of each subconductor 50 are heavily effected by the combines fields and would be expected to have ac losses. FIG. 6 illustrates the relation between the ac losses and the peak transport current for the central tapes and the end tapes 61, 62. The central tapes 60 have much lower perpendicular edge fields and have lower ac losses than the isolated tape. These subconductors 50 are assembled into a phase conductor 30, shown in FIG. 2 with larger subconductor spacing 70. Closing the tape-gap 67 pushes field out to the ends of the subconductor 50 and further increases loss there, closing the subconductor spacing 70 also increases perpendicular fields.

The number of tapes 60 per subconductor are optimized to enhance the relationship between the losses of the end tapes 61, 62 and the reduced losses of the central tapes 60. AC losses are minimized by minimizing the component of magnetic field perpendicular to said tape 60 and by maximizing the component of magnetic field parallel by positioning said tape 60 substantially in parallel to local magnetic field.

In a cable phase all these tapes 60 would be connected in parallel and in this design the current would tend to redistribute to produce the same voltage drop along each tape 60. The major contribution to the voltage is the ac loss; thus there would be a natural tendency for current to transfer to the lower loss, inner tapes 60.

Although the invention is described herein with reference to the preferred embodiment, one skilled in the art will readily appreciate that other embodiments may be substituted for those set forth herein without departing from the spirit and scope of the present invention. As such, the described embodiments are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. A subconductor for a conductor located inside an aperture of an elongated dielectric member of a superconducting power transmission cable, the elongated dielectric member having a first end and a second end, said subconductor comprising:
    a support having a first side and extending substantially between the first end and the second end of the elongated dielectric member, said support being made of a non-superconducting material;
    a plurality of tapes affixed to said first side in an array, each of said tapes having a pair of edges and being made of at least one superconducting material, said array being configured so that said plurality of tapes form a tape-gap having a width between said edges of adjacent tapes.

2. A subconductor as defined in claim 1, wherein said array is planar.
3. A subconductor as defined in claim 1, wherein said array is curved.
4. A subconductor as defined in claim 1, wherein said support is made from steel.
5. A subconductor as defined in claim 1, wherein said support is made from hastelloy.
6. A subconductor as defined in claim 1, wherein said support includes at least one edge which is rounded.
7. A subconductor as defined in claim 1, wherein said support includes a second side opposite said first side and a second plurality of tapes affixed to said second side in a second array, each of said second plurality of tapes having a pair of edges and being made of at least one superconducting material, said second array being configured so that said second plurality of tapes form a tape-gap having a width between said edges of adjacent tapes.

8. A conductor located inside an aperture of an elongated dielectric member of a superconducting power transmission cable, the elongated dielectric member having a first end and a second end, said conductor comprising:
    at least a first and a second subconductor with each subconductor comprising:
        a support having a first side and extending substantially between the first end and the second end of the elongated dielectric member, said support being made of a non-superconducting material;
        a plurality of tapes affixed to said first side in an array, each of said tapes having a pair of edges and being made of at least one superconducting material, said array being configured so that said plurality of tapes form a tape-gap having a width between said edges of adjacent tapes,
    wherein said at least a first and a second subconductor are located inside the aperture of the elongated dielectric member to define a subconductor spacing that is maintained throughout the elongated dielectric member.

9. A conductor as defined in claim 8, wherein said array of each subconductor is planar.
10. A conductor as defined in claim 8, wherein said array of each subconductor is curved.
11. A conductor as defined in claim 8, wherein said support of at least one subconductor is made from steel.
12. A conductor as defined in claim 8, wherein said support of at least one subconductor is made from hastelloy.
13. A conductor as defined in claim 8, wherein said support of at least one subconductor includes at least one edge which is rounded.
14. A conductor as defined in claim 8, wherein said support of at least one subconductor includes a second side opposite said first side and a second plurality of tapes affixed to said second side in a second array, each of said second plurality of tapes having a pair of edges and being made of at least one superconducting material, said second array being configured so that said second plurality of tapes form a tape-gap having a width between said edges of adjacent tapes.

15. A superconducting power transmission cable comprising:
    an elongated dielectric member having a first end and a second end, said elongated dielectric member being formed with a first aperture and a second aperture extending between said first end and said second end;
    a means for thermally insulating said elongated dielectric member;

a first conductor located within said first aperture;

a second conductor located within said second aperture;

each of said first conductor and said second conductor extending between said first end and said second end of said elongated dielectric member and comprising:

at least a first and a second subconductor with each subconductor comprising:

a support having a first side and extending substantially between the first end and said second end of said elongated dielectric member, said support being made of a non-superconducting material;

a plurality of tapes affixed to said first side in an array, each of said tapes having a pair of edges and being made of at least one superconducting material, said array being configured so that said plurality of tapes form a tape-gap having a width between said edges of adjacent tapes, wherein said at least a first and a second subconductor define a subconductor spacing that is maintained throughout the elongated dielectric member; and a means for cooling said first conductor and said second conductor.

16. A superconducting power transmission cable as defined in claim 15, wherein said means for thermally insulating said elongated dielectric member is a cryogenic insulation jacket.

17. A superconducting power transmission cable as defined in claim 15, wherein said first aperture and said second aperture are coplanar.

18. A superconducting power transmission cable as defined in claim 15, wherein said means for cooling said first conductor and said second conductor includes a liquid coolant provided in at least one said first aperture and said second aperture.

19. A superconducting power transmission cable as defined in claim 15, further comprising a third conductor wherein said elongated dielectric member is formed with a third aperture extending between said first end and said second end; and said third conductor being located within said third aperture and extending between said first end and said second end of said elongated dielectric member, said third conductor comprising:

at least a first and a second subconductor with each subconductor comprising:

a support having a first side and extending substantially between the first end and said second end of said elongated dielectric member, said support being made of a non-superconducting material;

a plurality of tapes affixed to said first side in an array, each of said tapes having a pair of edges and being made of at least one superconducting material, said array being configured so that said plurality of tapes form a tape-gap having a width between said edges of adjacent tapes, wherein said at least a first and a second subconductor define a subconductor spacing that is maintained throughout the elongated dielectric member; and means for cooling said third conductor.

* * * * *